Patented Aug. 18, 1931

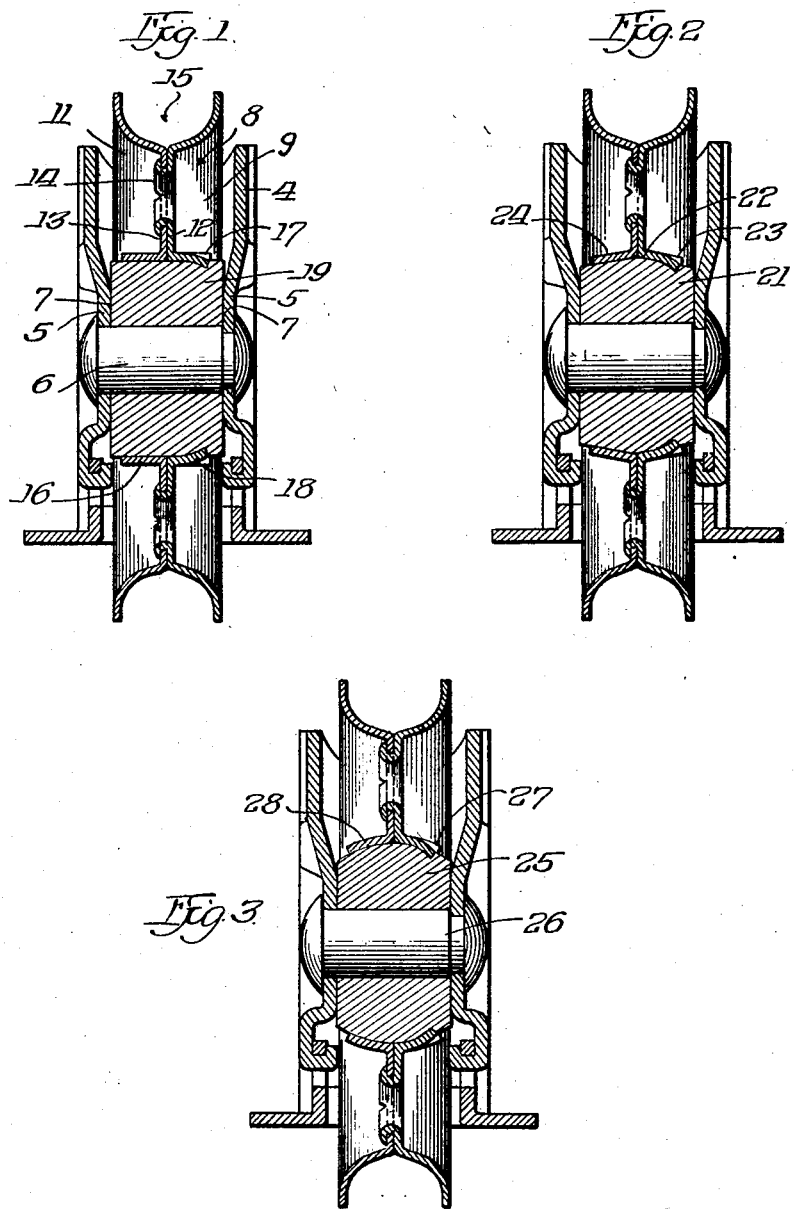

1,819,334

UNITED STATES PATENT OFFICE

EDWIN W. NORTH, OF ROCKFORD, ILLINOIS, ASSIGNOR TO NATIONAL LOCK CO., OF ROCKFORD, ILLINOIS, A CORPORATION OF DELAWARE

SASH PULLEY

Application filed May 18, 1928. Serial No. 278,657.

This invention relates to pulleys in general and more particularly to sash pulleys.

Sash pulleys and the like are used in great abundance and must be manufactured very cheaply in order to be marketable. In addition they are used where they are quite inaccessible for lubrication purposes.

The primary object of this invention is accordingly to provide a pulley which is economical of manufacture, which does not require frequent lubrication and which permits of relative adjustment of the pulley and housing during manufacture thereof.

Another object of this invention is to provide a pulley having the foregoing characteristics and which is extremely light in weight.

Other and further objects of this invention will become apparent as the same becomes better understood from an examination of the specification and claims in connection with the accompanying drawings wherein:

Fig. 1 represents a transverse sectional view of a sash pulley embodying this invention;

Fig. 2 is a similar view of a modification;

Fig. 3 is a similar view of another modification.

Referring to the drawings more particularly, numeral 4 represents a standard sheet metal sash pulley housing provided with opposite inwardly struck portions 5 on its respective walls. A transverse pin 6 for the pulley is mounted in the housing 4 and extends through the centers of the respective portions 5. The portions 5 provide annular bearing surfaces 7 respectively on the inner walls of the housing spaced from the normal planes of the respective opposite walls for engaging the pulley and centering the same within the housing.

The pulley is generally designated by the reference character 8 and is formed by stamping two sheet metal similar complemental parts 9 and 11 respectively securing said parts together and mounting the bearing within the parts. The parts 9 and 11 each have annular web portions 12 and 13 respectively and are riveted together by striking a plurality of spaced tangs 14 integral with the portion 12 through corresponding apertures in the portion 13 with the ends of said tangs overlapping the latter portion at the marginal edges of said apertures.

The parts 9 and 11, previous to their being riveted together, are stamped to provide oppositely curved circular marginal portions which cooperate to form a peripheral groove 15 on the pulley to provide a track for a cord.

The parts 9 and 11 are also stamped, previous to their being riveted together, to provide oppositely extending annular flanges 16 and 17 respectively which cooperate to form a hollow cylindrical support for the bearing.

The annular flange 17 is provided with a plurality of cut tangs 18. After the body of the pulley has been formed by securing the parts 12 and 13 together these parts are suitably treated with the usual coating or finish and the bearing in the form of a cylindrically shaped lubricant impregnated wood bushing 19 is positioned within the flanges 16 and 17 with the ends of said bushing projecting beyond the limits of the respective flanges. When the bushing 19 has been positioned the tangs 18 are struck inwardly so as to prevent both rotational and lateral movement of the bushing with respect to the body of the pulley. The opposite ends of the bushing 19 extend sufficiently beyond the limits of the flanges 16 and 17 to engage the respective surfaces 7 to center the pulley within the housing.

The opening in the bushing may be reamed after assembly or initially formed in order to assure proper alignment with the body of the pulley.

In Figure 2 there is shown a modification somewhat similar to the previous embodiment. In this modification the wood bushing 21 is shaped on its outer periphery to provide a central raised portion 22 the surface of said periphery sloping inwardly from said portion toward its respective opposite ends. In this modification the inner marginal flanges 23 and 24 formed on the respective complemental parts of the pulley body are sloped to cooperate with the outer periphery of the bushing 21 to engage the same on opposite sides of the central raised portion 22 whereby said bushing may be clamped between said parts as the latter are secured together.

In Figure 3 there is shown another modification which distinguishes from the embodiment shown in Figure 1 in that the outer periphery of the bushing 25 is a portion of the surface of a sphere the center of which is concentric with the opening in the bushing and midway between the ends of the bushing. The inner marginal flanges 27 and 28 on the respective complemental parts of the pulley body are shaped to conform to the spherical outer periphery of the bushing. In making this pulley the bushing 25 may be clamped between the complemental parts of the pulley body as they are secured together and thereafter rotated laterally to bring the axis of the bushing in proper alignment with respect to the body of the pulley. After the bushing has been positioned and aligned, tangs similar to the tangs 18 are struck inwardly from one of the flanges (27) thus securing the bushing against lateral rotational movement as well as rotational movement in the plane of the pulley. In this modification it will be noted the opening in the bushing 25 for the pin 26 may be formed prior to assembly of the pulley and thereafter accurately aligned with the pulley axis by reason of the adjustable characteristics of the bushing with respect to the body of the pulley.

I am aware that many changes may be made without departing from the principles of this invention and I therefore do not wish to be limited to the details shown or described.

I claim:

1. A sheet metal pulley comprising a body formed of two complemental parts centrally apertured and having inner marginal flange portions and a fibrous bushing, an external surface portion of which is in the surface of a sphere, supported within said marginal flange portions by said surface portion.

2. A sheet metal pulley comprising a body formed of two complemental parts centrally apertured and having inner marginal flange portions and a fibrous bushing, an external surface portion of which is in the surface of a sphere, supported within said marginal flange portions with said surface portion engaged therewith, one of said flange portions provided with a tang struck therefrom for securing the bushing against lateral rotational movement and rotational movement in the plane of the pulley relative to the body.

3. In a pulley of the type described, a pulley body having a portion providing a bushing receiving opening therethrough, and a bushing disposed through said opening, said body portion and bushing having cooperative curved contacting surfaces arranged to permit adjustment of said bushing relative to said body about an axis lying in a plane parallel the plane of said body whereby the axis of the bushing may be adjusted to any desired angle with respect to the axis of the pulley.

In witness of the foregoing I affix my signature.

EDWIN W. NORTH.